(12) United States Patent
Johnson et al.

(10) Patent No.: US 8,615,541 B2
(45) Date of Patent: Dec. 24, 2013

(54) EXTENDED-PRECISION INTEGER ARITHMETIC AND LOGICAL INSTRUCTIONS

(75) Inventors: Richard Craig Johnson, Cary, NC (US); John R. Nickolls, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 509 days.

(21) Appl. No.: 12/889,354

(22) Filed: Sep. 23, 2010

(65) Prior Publication Data

US 2011/0078225 A1  Mar. 31, 2011

Related U.S. Application Data

(60) Provisional application No. 61/245,220, filed on Sep. 23, 2009.

(51) Int. Cl.
*G06F 7/38* (2006.01)
(52) U.S. Cl.
USPC .......................................... 708/495; 708/524

(58) Field of Classification Search
USPC ................................................ 708/495, 524
See application file for complete search history.

(56) References Cited

U.S. PATENT DOCUMENTS

| | | | | |
|---|---|---|---|---|
| 5,134,578 A | * | 7/1992 | Garverick et al. | 708/605 |
| 5,710,935 A | * | 1/1998 | Barker et al. | 712/20 |
| 6,240,505 B1 | * | 5/2001 | Boutaud et al. | 712/38 |
| 6,408,320 B1 | * | 6/2002 | Shiell | 708/518 |

* cited by examiner

*Primary Examiner* — Tan V. Mai
(74) *Attorney, Agent, or Firm* — Patterson & Sheridan, L.L.P.

(57) ABSTRACT

The invention set forth herein describes a mechanism for efficiently performing extended precision operations on multi-word source operands. Corresponding data words of the source operands are processed together via each instruction of a cascading sequence of instructions. State information generated when each instruction is processed is stored in condition code flags. The state information is optionally used in the processing of subsequent instructions in the sequence and/or accumulated with previously set state information.

21 Claims, 8 Drawing Sheets

EXTENDED-PRECISION INTEGER ARITHMETIC AND LOGICAL INSTRUCTIONS

CROSS-REFERENCE TO RELATED APPLICATIONS

This application claims benefit of United States provisional patent application entitled "Extended-Precision Integer Arithmetic and Logical Instructions," filed on Sep. 23, 2009 and having a Ser. No. 61/245,220.

BACKGROUND OF THE INVENTION

1. Field of the Invention

The present invention relates generally to the field of parallel processing and, more specifically, to processing extended-precision integer arithmetic and logical instructions.

2. Description of the Related Art

In typical SIMT or SIMD processor architectures, where groups of parallel threads execute a common instruction stream, machine instructions for integer arithmetic, logical operations, and comparisons do not support efficient extended-precision (multi-word) computations along with the correct setting of condition codes. For example, a normal integer ADD instruction supports optional addition with carry-in and optional writing of a condition code register. This allows two extended-precision values, each k words long, to be added in k instructions, but the resulting condition code register does not represent the overall status of the extended-precision result. In particular, the zero flag of the condition code indicates only whether the most-significant word of the result is zero rather than whether the entire k-word result is zero. A separate k-step instruction sequence would be needed to compare the multi-word result with zero, e.g. for controlling a subsequent branch instruction.

Other extended-precision operations are even less efficient. To perform a multi-word MIN (or MAX) using prior machine instructions, one must process multi-word inputs from most-significant to least-significant word, comparing words at each step to determine which input is smaller (or larger). The comparisons continue as long as the input words are equal; unequal words determine the order of the multi-word inputs, and the remaining words must be selected from the smaller (or larger) input. This processing would require inefficient branching or looping constructs, which are particularly inefficient in parallel SIMT and SIMD architectures, because they force multiple parallel threads to follow the additional instructions required by only some threads.

As the foregoing illustrates, what is needed in the art is a mechanism for efficiently performing extended precision operations in a SIMT or SIMD processing environment.

SUMMARY OF THE INVENTION

One embodiment of the present invention is a computer-implemented method for performing an extended precision operation. The method includes the steps of receiving a set of instructions for performing an extended precision operation on at least one extended precision source value, wherein an extended precision source value includes at least two fixed-size data words, based on a first instruction included in the set of instructions, performing a first operation on a first data word of a first extended precision source value included in the at least one extended precision source value to generate a first portion of a result for the extended precision operation, storing state information associated with the first portion of the result in one or more state registers, based on a second instruction included in the set of instructions, performing a second operation on a second data word of the first extended precision source value to generate a second portion of the result for the extended precision operation, and accumulating state information stored in at least one of the one or more state registers with state information associated with the second portion of the result, wherein the accumulated state information indicates overall state associated with the result for the extended precision operation.

Advantageously, the technique described herein allows for the efficient calculation of extended precision integer arithmetic, logical, and comparison operations with reduced instruction count compared to prior architectures. In addition, state information is propagated using condition code flags in each thread to indicate the status of the entire result rather than the last word-length partial result at no cost above computing the multi-word result. Further, the technique described herein does not add any new machine state per thread or per processor, which is crucial for cost-efficient implementation in parallel SIMT/SIMD architectures that support multiple parallel threads.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
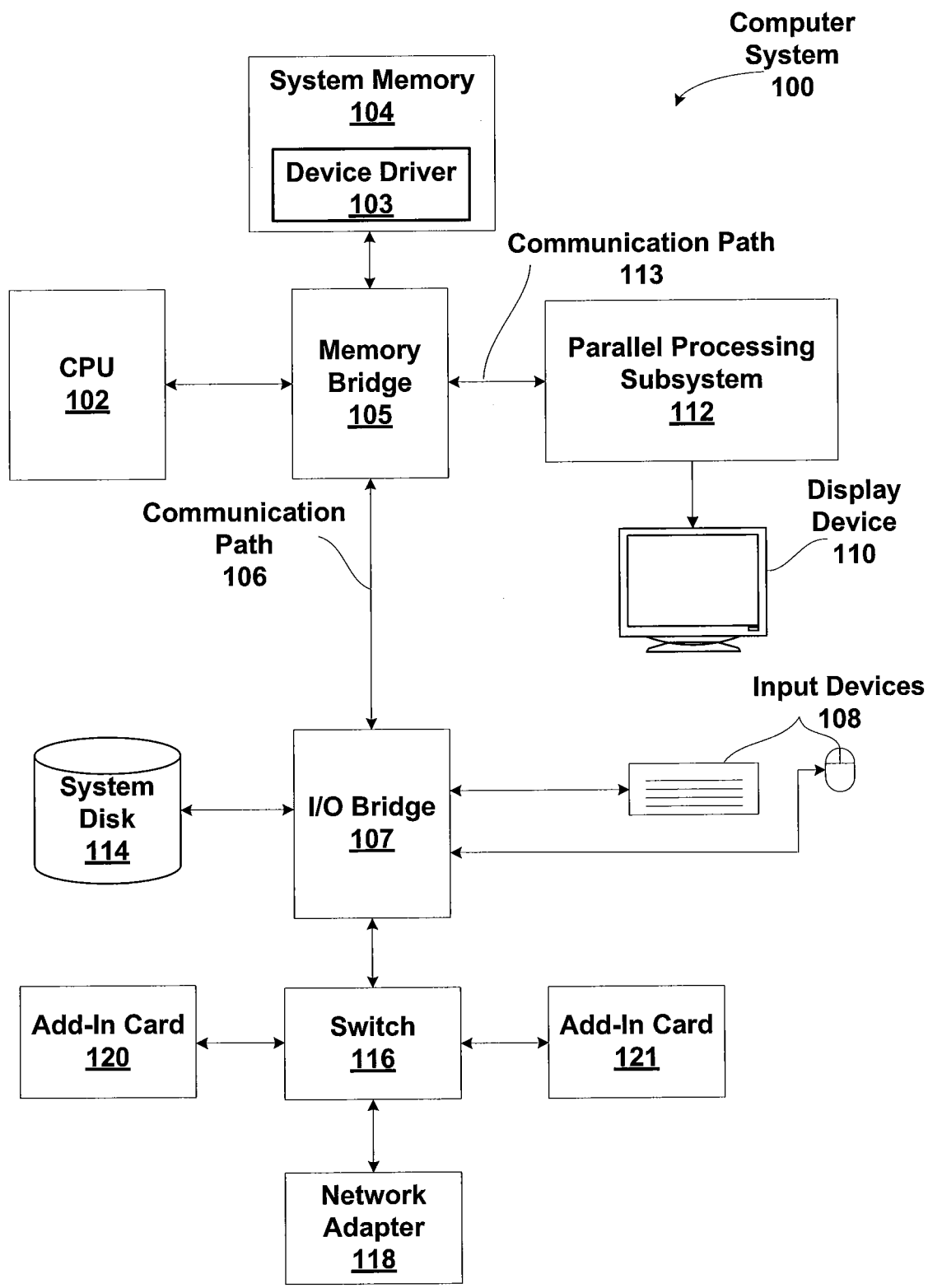
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
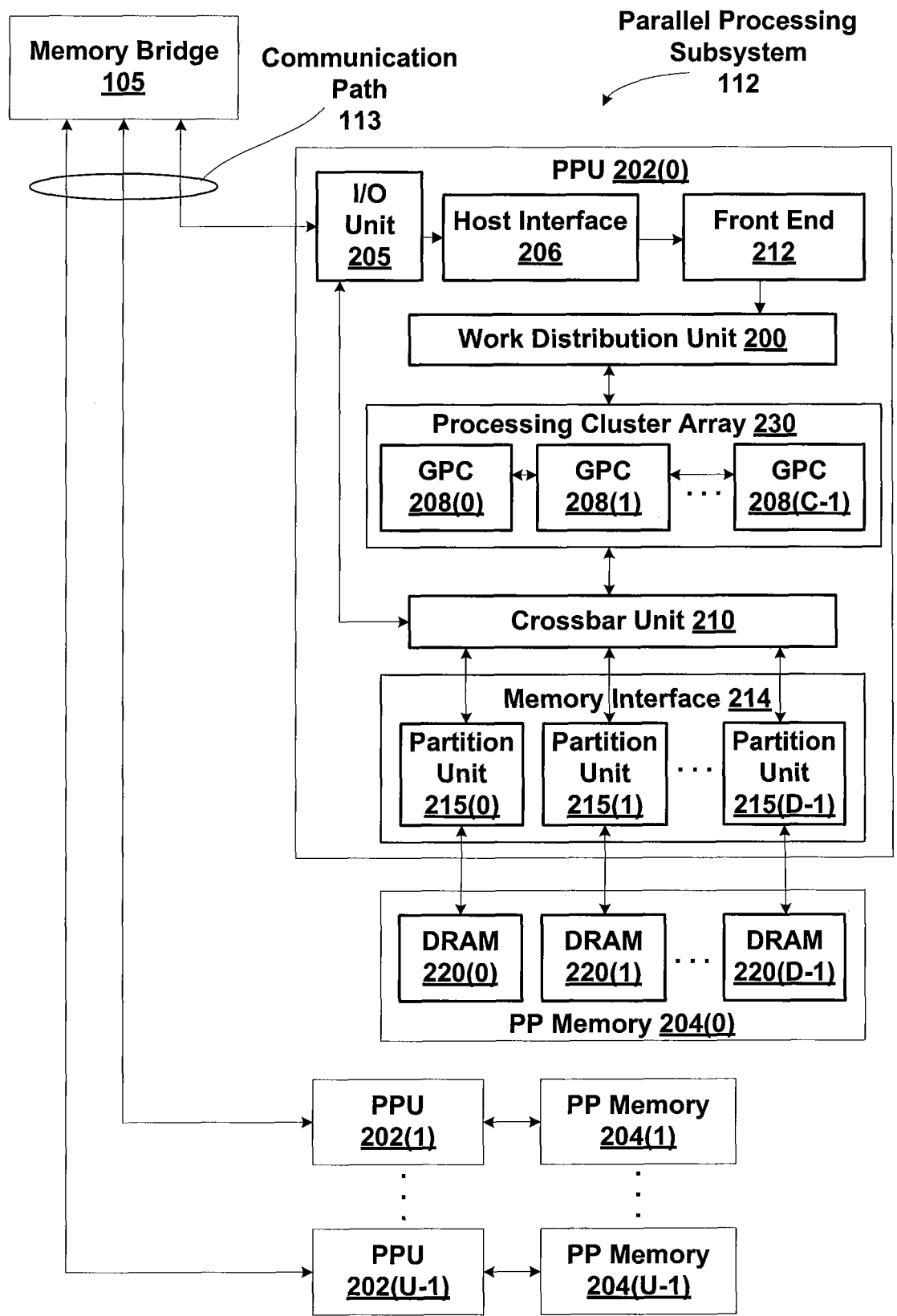
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
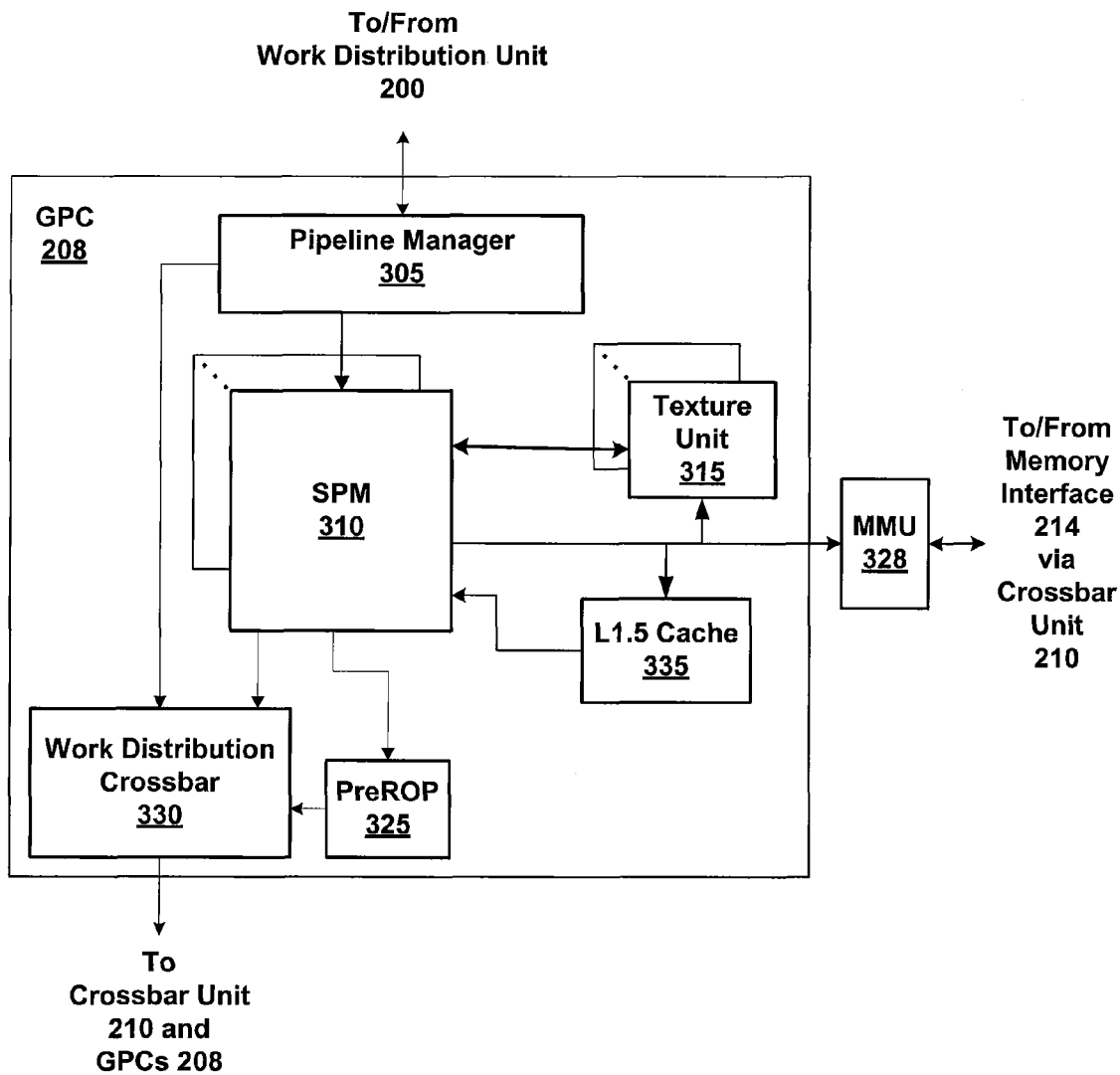
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
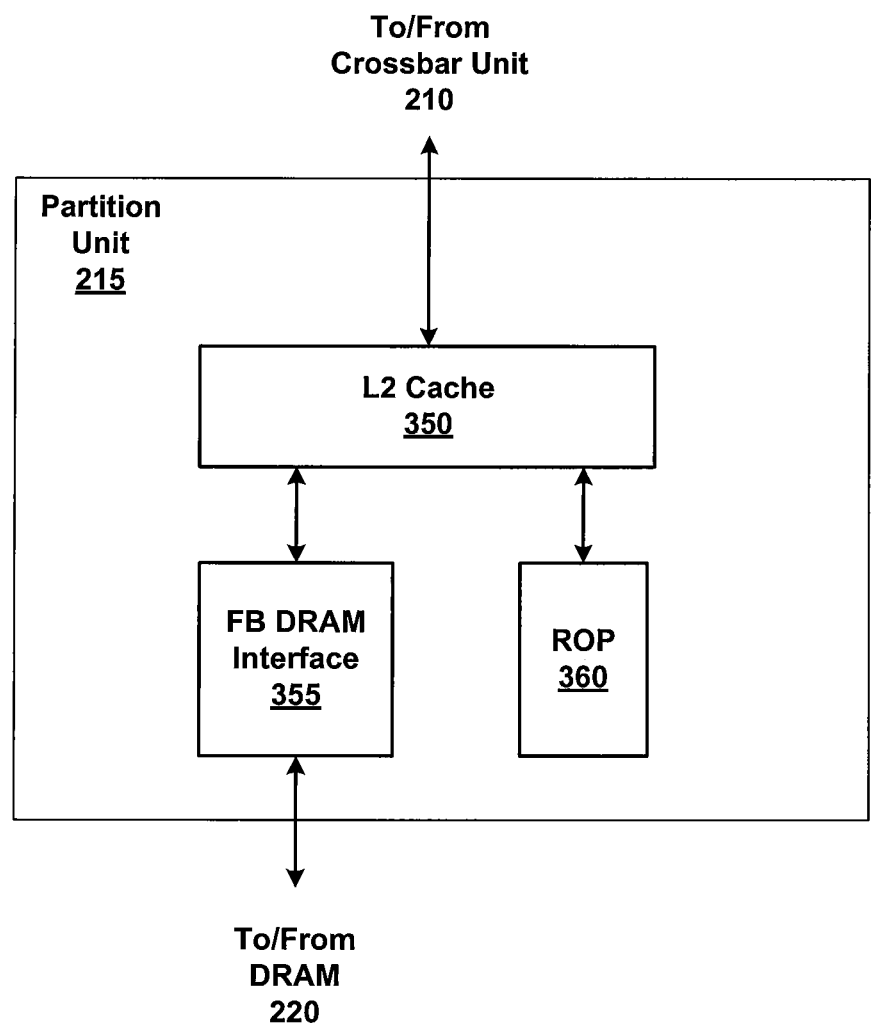
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
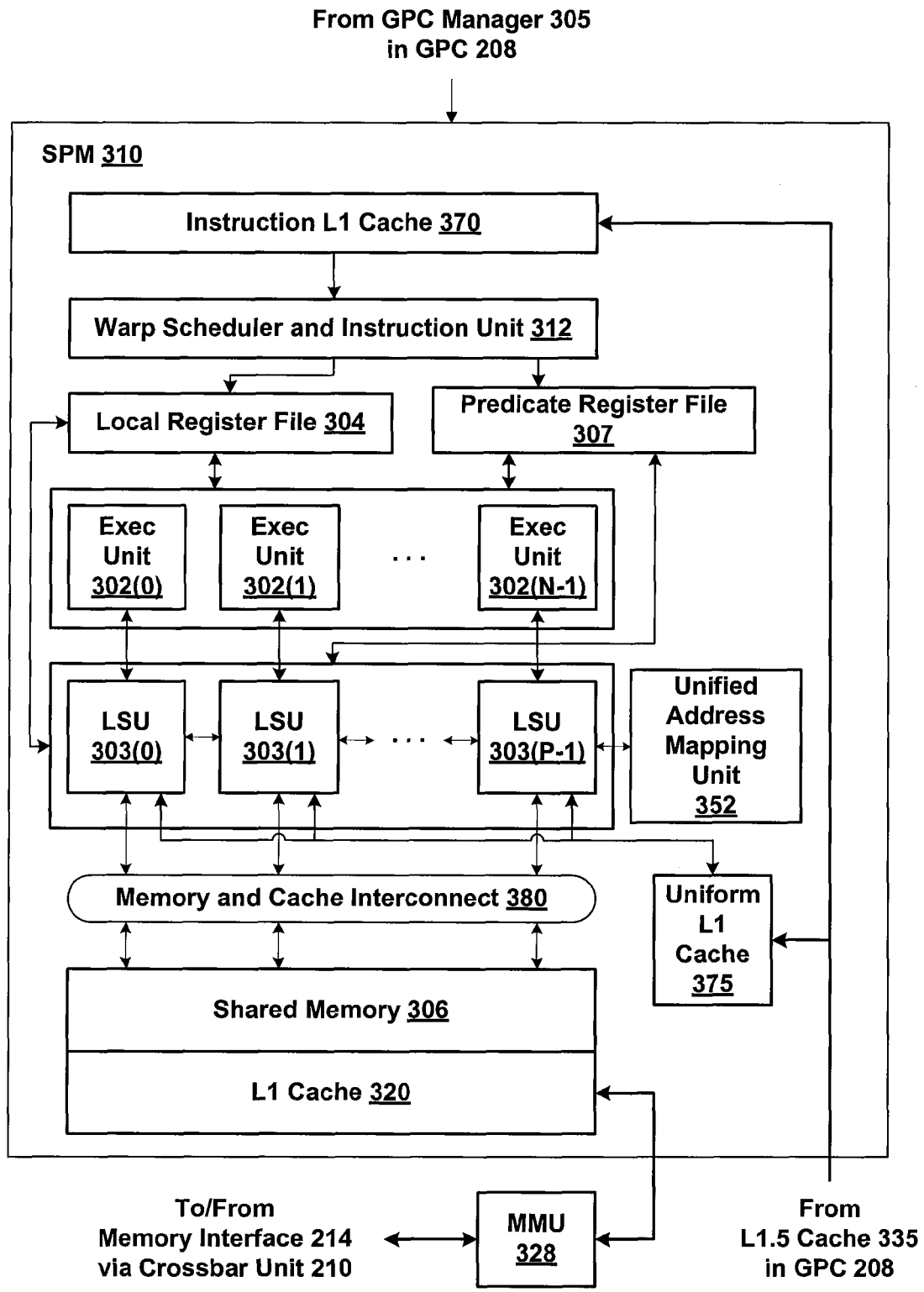
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Predicate register file 307 includes predicate registers for each CTA thread. Predicate register file 307 is described in greater detail below with respect to FIGS. 4 and 5.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

Figure 4:
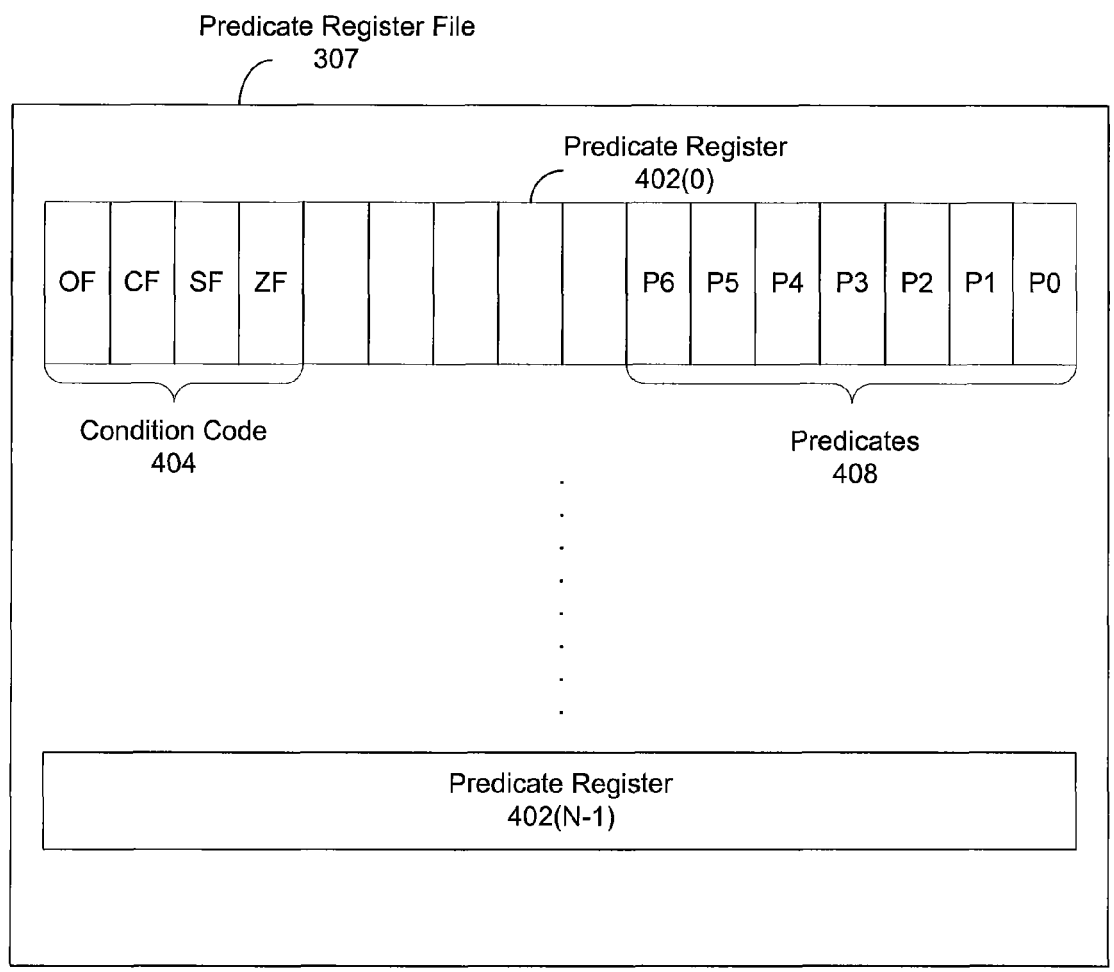
FIG. 4 is a more detailed diagram of the predicate register file of FIG. 3C, according to one embodiment of the present invention.

FIG. 4 is a more detailed diagram of the predicate register file 307 of FIG. 3C, according to one embodiment of the present invention. As shown, the predicate register file 307 includes multiple predicate registers 402. Each predicate register 402 is associated with a different thread executing within the SPM 310 on the execution units 302. For the purpose of discussion only, predicate register 402(0) which is associated with one active thread, is described below in greater detail. Predicate register 402(0) includes a condition code 404 and predicates 408.

The condition code 404 comprises four 1-bit condition code flags: OF (overflow flag), CF (carry flag), SF (sign flag), and ZF (zero flag). Within each thread the condition code may be optionally written by instructions; the condition code is typically written by integer and floating-point arithmetic instructions to indicate properties of the arithmetic result. The predicates 408 comprise seven 1-bit predicates that can be consumed by the thread associated with the predicate register 402(0). Each of the predicates P0-P6 in predicates 408 indicates one bit of state associated with the thread, where a value of 0 for a predicate indicates False and value of 1 indicates True. In addition to predicates P0-P6, a reserved instruction encoding for a True predicate, PT, whose value is always 1 is provided. Predicate PT is not shown in FIG. 4 because it does not require any per-thread state. Predicate PT may be used as a source operand when a constant True predicate value is needed, and as a destination operand when an instruction has no live-out predicate result; writes to PT are ignored.

Performing Extended Precision Arithmetic and Logical Instructions

An extended precision operation is performed on extended precision source operands, where each source operand includes multiple data words. This discussion uses 32-bit words and 32-bit registers as examples, but the invention applies to any size word and register. In a parallel SIMT or SIMD environment, to perform an extended precision operation, each thread executes a cascaded sequence of instructions that operate on the data words of the source operands, moving from least-significant to most-significant word or vice versa. At each step of the sequence, state information is set in the condition code 404 of each thread for subsequent instructions in the sequence as well as for propagating throughout the computation.

In operation, each instruction in the sequence of instructions operates on corresponding data words of each source operand. For example, in a least-significant to most-significant processing order, the first instruction in the sequence of instructions operates on the least-significant data word of each source operand. The result of the operation is stored in a destination register, and state information, such as overflow, sign, zero-ness and carry, is stored in the corresponding portions of the condition code 404. A next instruction in the sequence operates on the next remaining least-significant data words of the different source operands, optionally incorporating the state information stored by the previous instruction. The result of the operation is stored in a different destination register, and state information generated by the operation is optionally stored in or accumulated with the corresponding portions of the condition code 404 associated with each thread. This sequence continues until the most-significant data words of the different source operands have been processed. The result of the extended precision operation is thus stored in the destination registers and state information associated with the result is stored in the condition code 404 associated with each thread.

There are several different types of extended precision operations, such as arithmetic operations, logical operations, compare-and-set operations, min/max operations, and shift operations. The execution of each of the different types of extended precision operations is described in greater detail below. For exemplary purposes only, the execution is described in the context of one thread of the SIMT processing environment associated with predicate register 402(0) and registers R0-R8 in the local register file 304. The examples use 32-bit words and 32-bit registers associated with each thread; the invention applies to any word size and register size. In addition, in the following discussion, CC.OF, CC.CF, CC.SF and CC.ZF refer to the overflow flag, the carry flag, the sign flag and the zero flag, respectively, of condition code 404 associated with each thread. In addition, extended-precision operations are denoted with .X (and .XLO, .XMED, .XHI) suffixes. Also, we should explain that .CC on the destination register denotes a write to the condition code register.

Extended Precision IADD.X

An extended precision integer addition operation can be performed on extended precision source operands via an IADD instruction. Data words of the extended precision source operands are processed via a sequence of IADD instructions in order from least-significant to most-significant. At each step of the sequence, the carry flag is set to indicate whether a carry value was generated when the corresponding data words were processed. When the carry flag is set, the subsequent instruction in the sequence adds the carry-in to the arithmetic operation. The sign and overflow flags are set to indicate the state information associated with the most-significant data word operation. The zero flag is accumulated across the sequence of instructions, that is, the zero flag indicates the zero-ness of the entire result of the extended precision operation. More specifically, the zero flag is set if the incoming zero flag is set and the current word result is also zero; otherwise the zero flag is cleared.

The following addition/subtraction modes exist for the extended precision integer addition operation IADD.X:

| | |
|---|---|
| Ra + Sb: | Ra + Sb + CC.CF |
| Ra − Sb: | Ra + ~Sb + CC.CF |
| −Ra + Sb: | ~Ra + Sb + CC.CF, | where Ra and Sb are extended precision source operands.

Below is an example of performing an extended precision integer addition operation on two 64-bit source operands each composed of two 32-bit words in two 32-bit registers. One source operand is stored in registers R3 and R2 and the other source operand is stored in registers R5 and R4. The result of the extended precision integer addition operation is stored in registers R1 and R0.

```
// extended-precision IADD. 64-bit values in register pairs
// [R1,R0] = [R3,R2] + [R5,R4]
//Instruction Sequence
IADD      R0.CC,R2,R4;    // First instruction, writes condition code CC
IADD.X    R1.CC,R3,R5;    // Second instruction, reads & writes CC
```

When the first instruction in the instruction sequence is processed, the least-significant data words of the source operands stored in R2 and R4 are added. The result is stored in register R0 and state information is captured in the CC.OF, CC.CF, CC.SF and CC.ZF of the condition code 404. When the second instruction in the instruction sequence is processed, the most-significant data words of the source operands stored in R2 and R4 as well as the carry-in value set by the previous instruction in CC.CF are added. The result is stored in register R1 and any additional state information is captured in the CC.OF, CC.CF, CC.SF and CC.ZF of the condition code 404. Importantly, CC.OF, CC.CF and CC.SF, when set by the second instruction, indicate state information generated by the second instruction. CC.ZF, however, is accumulated across the instructions by combining the CC.ZF set by the previous instruction with the CC.ZF generated by the current instruction. Specifically, the new CC.ZF is set to the (prior CC.ZF && (most-significant result word==0)). In this manner, CC.ZF indicates the zero-ness of the entire result of the extended precision integer addition operation.

Extended Precision IMAD.X

An extended precision integer multiply-add operation can be performed on extended precision source operands via an IMAD instruction. More specifically, the extended precision IMAD and IADD instructions are used in conjunction with IMUL to perform extended-precision multiplication (or extended-precision multiply-add with additional IADDs). Data words of the extended precision source operands are processed via a sequence of IMAD instructions in order from least-significant to most-significant. Similar to the extended precision integer addition operation, at each step of the sequence, the carry flag is set to indicate whether a carry value was generated when the corresponding data words were processed. When the carry flag is set, the subsequent instruction in the sequence adds the carry-in to the arithmetic operation. The sign and overflow flags are set to indicate the state information associated with the most-significant data word operation. The zero flag is accumulated across the sequence of instructions.

The following addition/subtraction modes exist for the extended precision integer multiply-add operation:

| | |
|---|---|
| (Ra * Sb) + Sc: | (Ra * Sb) + Sc + CC.CF |
| (Ra * Sb) − Sc: | (Ra * Sb) + ~Sc + CC.CF |
| −(Ra * Sb) + Sc: | ~(Ra * Sb) + Sc + CC.CF, | where Ra, Rb and Sb are extended precision source operands.

Below is an example of performing an extended precision integer multiply-add operation on two 64-bit source operands each composed of two 32-bit words in two 32-bit registers. One source operand is stored in registers R5 and R4 and the other source operand is stored in registers R7 and R6. The result of the extended precision integer addition operation is a 128-bit result stored in registers R3, R2, R1 and R0. As shown in the example below, a sequence of IMAD, IADD, and IMUL instructions is required to perform extended-precision multiply and/or multiply-add.

```
// extended-precision multiply:
// [R3,R2,R1,R0] = [R5,R4] * [R7,R6]
IMUL.LO    R0.CC,R4,R6;      # R0=(R4*R6)[31: 0], sets ZF, clear CF
IMAD.HI.X  R1.CC,R4,R6,RZ;   # R1=(R4*R6)[63:32], CF remains clear
IMAD.LO.X  R1.CC,R5,R6,R1;   # R1+=(R5*R6)[31: 0], carry-out
                               possible
IMAD.HI.X  R2.CC,R5,R6,RZ;   # R2=(R5*R6)[63:32]+carry, no
(CF=0)                         carry-out
IMAD.LO.X  R1.CC,R4,R7,R1;   # R1+=(R4*R7)[31: 0], no CC
IMAD.HI.X  R2.CC,R4,R7,R2;   # R2+=(R4*R7)[63:32]+CC, possible
                               Carry-out
IADD.X     R3.CC,RZ,RZ;      # R3 = CC, no carry-out
IMAD.LO.X  R2.CC,R5,R7,R2;   # R2+=(R5*R7)[31: 0], no carry-in
IMAD.HI.X  R3.CC,R5,R7,R3;   # R3+=(R5*R7)[63:32]+CC, final flags
```

Extended Precision LOP.X

An extended precision logical operation can be performed on extended precision source operands via a LOP instruction. An extended-precision logical operation is performed by processing words in order from least-significant to most-significant. This order is required so that the sign flag will be set correctly based on the logical operation performed on the most-significant words of the source operands. The CC.ZF is accumulated as described above in conjunction with the IADD and the IMAD instructions. The logical operations supported by a LOP instruction include AND, OR, XOR and PASS.

Below is an example of performing an extended precision logical XOR operation on two 64-bit source operands, each composed of two 32-bit words in 32-bit registers. One source operand is stored in registers R3 and R2 and the other source operand is stored in registers R5 and R4. The result of the extended precision integer addition operation is stored in registers R1 and R0.

```
// extended-precision XOR of 64-bit values
// [R1,R0] = [R3,R2] XOR [R5,R4]
//Instruction Sequence
LOP.XOR    R0.CC,R2,R4;     // First instruction
LOP.XOR.X  R1.CC,R3,R5;     // Second instruction
```

When the first instruction in the instruction sequence is processed, an XOR logical operation is performed on the least-significant data words of the source operands stored in R2 and R4. The result of the XOR operation is stored in register R0 and state information is captured in the CC.OF, CC.CF, CC.SF and CC.ZF of the condition code 404. When the second instruction in the instruction sequence is processed, an XOR logical operation is performed on the most-significant data words of the source operands stored in R2 and R4. The result of the second XOR operation is stored in register R1 and any additional state information is captured in the CC.OF, CC.CF, CC.SF and CC.ZF of the condition code 404. Importantly, CC.OF, CC.CF and CC.SF, when set by the second instruction, indicate state information generated by the second instruction. CC.ZF, however, is accumulated across the instructions by combining the CC.ZF set by the previous instruction with the CC.ZF generated by the current instruction. Specifically, the new CC.ZF is set to the (prior CC.ZF && (most-significant result word==0)). In this manner, CC.ZF indicates the zero-ness of the entire result of the extended precision logical XOR operation.

Extended Precision IMNMX.X

An extended precision integer minimum/maximum can be performed on extended precision source operands via an IMNMX instruction. Based on a source predicate, the IMNMX instruction performs either a minimum operation on the extended precision source operands or a maximum operation on the extended precision source operands. In another embodiment, integer minimum and integer maximum instructions are two distinct instructions that operate in a manner similar to the IMNMX instruction without the source predicate.

To support extended precision integer minimum/maximum, the IMNMX instruction has three different types, the IMNMX.XLO, IMNMX.XMED, IMNMX.XHI. When performing an extended precision integer minimum/maximum, data words of the extended precision source operands are processed one word at a time, starting with the most-significant word. As soon as the overall ordering of the two extended precision source operands is determined in each SIMT/SIMD thread, the remaining IMNMX instructions simply select the correct input based on the ordering. .XHI is used to process the high-order data word, .XLO is used to process the low-order data word, and .XMED is used to process any data words in the middle (e.g., for 96-bit and larger values). For signed minimum and maximum, only the high-order word should be processed as signed number. The lower-order words should be processed as unsigned number for correctness of the operation (see example below).

In extended-precision mode, each thread's condition code flags CC.ZF and CC.SF are set as previously described herein. The CC.ZF is accumulated across all data words of the extended-precision result. The CC.SF is set based on the result of the first IMNMX instruction in a sequence so that CC.SF correctly represents the sign of the extended-precision result. The CC.CF is used to indicate in each thread whether the overall order has been determined. The CC.CF remains true as long as all the higher-order words evaluated by the sequence of instructions are equal. When a pair of data words included in the source operands is not equal, the CC.CF is set to false. In each thread, the CC.OF is used to indicate the order once it has been determined, so that subsequent IMNMX instructions can select the appropriate source operand to copy to the destination register. The final IMNMX instruction clears CC.CF and CC.OF, so that the condition code 404 represents the correct flags for the extended-precision result.

Below is an example of performing an extended precision logical MIN operation on two 96-bit source operands. One source operand is stored in registers R5, R4, and R3 and the other source operand is stored in registers R2, R1, and R0. The result of the extended precision integer addition operation is stored in registers R8, R7, and R6.

---

// extended-precision MIN  
// [R5, R4, R3] and [R2, R1, R0] hold 96-bit values  
IMNMX.S32.XHI R8.CC,R5,R2,PT;     # First instruction  
IMNMX.U32.XMED R7.CC,R4,R1,PT     # Second instruction  
IMNMX.U32.XLO R6.CC,R3,R0,PT;     # Third instruction

---

When the first instruction in the instruction sequence is processed, a minimum operation is performed on the high-order data words of the source operands. More specifically, it is determined whether one of the high-order data words stored in registers R5 and R2 is less than the other. If so, then the CC.CF flag is cleared to indicate that a decision is made, and the CC.OF is set to indicate which of the two operands is less than the other (referred to herein as the "selected operand"). The high-order data word of the selected operand is stored as the higher-order data word of the result, i.e., in register R8. The subsequent instructions, i.e., the second and third instructions, then simply select the corresponding middle-order and lower-order data words from the operand indicated by the CC.OF flag and store the resulting data words in registers R7 and R6.

If however, the high-order data words are equal, then the CC.CF flag remains set and the CC.OF flag does not include any meaningful state. The high-order data word of either of the two operands is stored as the higher-order data word of the result, i.e., in register R8. In such a scenario, the second instruction is processed to determine whether one of the middle-order data words stored in registers R4 and R1 is less than the other. If so, then the CC.CF flag is cleared to indicate that a decision is made, and the CC.OF is set to indicate which of the two operands is less than the other. The middle-order data operand of the selected operand is stored as the middle-order data word of the result, i.e., in register R7. The subsequent instruction, i.e., the third, then simply selects the corresponding lower-order data word from the operand indicated by the CC.OF flag and store the resulting data word in register R6.

If however, the middle-order data words are equal, then the CC.CF flag remains set and the CC.OF flag does not include any meaningful state. The high-order data word of either of the two operands is stored as the middle-order data word of the result, i.e., in register R7. In such a scenario, the third instruction is processed to determine whether one of the lower-order data words stored in registers R3 and R0 is less than the other. The lesser lower-order data word is stored as the lower-order data word of the result, i.e., in register R6. The third instruction also clears CC.CF and CC.OF and updates the correct state information so that the condition code 404 represents the correct flags for the extended-precision result.

Extended Precision SHL.X

An extended precision shift left operation can be performed on extended precision source operands via an SHL instruction. An extended-precision left shift is performed by processing data words of the extended precision source operands in order from most-significant to least-significant. At the end of the extended-precision shift instruction sequence, the condition code flags reflect the overall multi-word result. The CC.CF, CC.SF and the CC.CF flags of the condition code 404 are set by the initial left shift instruction on the most-significant word. The CC.ZF is accumulated across the instruction sequence as previously described herein.

Below is an example of performing an extended precision shift left operation on one 64-bit source operand composed of two 32-bit words in two 32-bit registers. The source operand is stored in registers R1 and R0 and the shift operand is stored in register R6. As shown in the example below, a sequence of SHL (shift left), SHR.X (extended precision shift right described below), and OR instructions is required to perform extended-precision extended precision shift left operation.

---

64-bit left shift,       [R1,R0] << R6, R6=n, R7=32-n  
SHL      R1.CC,R1,R6;      # set flags, normal mode  
SHR.X    R8.CC,R0,R7;      # R8=R0>> (32-n); ZF acc'd; SF,CF,OF unch.  
OR       R1,R1,R8;         # CC unchanged  
SHL.X    R0.CC,R0,R6;      # ZF accumulated; SF,CF,OF unch.

Extended Precision SHR.X

An extended precision shift right operation can be performed on extended precision source operands via an SHR instruction. An extended-precision right shift is performed by processing data words of the extended precision source operands in order from least-significant to most-significant. The carry flag CC.CF is set by the initial shift instruction operating on the least-significant word. Intermediate words are processed by SHR.X, SHL.X, and OR instructions, and the most-significant word is processed by SHR.XHI. At the end of the extended-precision shift instruction sequence, the condition code flags reflect the overall multi-word result. The CC.SF and the CC.OF flag of the condition code 404 is set by the final right shift instruction SHR.XHI. The CC.ZF is accumulated across the instruction sequence as previously described herein.

Below is an example of performing an extended precision shift right operation on one 64-bit source operand composed of two 32-bit words in two 32-bit registers. The source operand is stored in registers R1 and R0 and the shift operand is stored in register R6. As shown in the example below, a sequence of SHR (shift left), SHL.X (extended precision shift right described below), OR, and SHR.XHI instructions is required to perform extended-precision extended precision shift right operation.

```
# 64-bit right shift,    [R1,R0] >> R6, R6=n, R7=32-n
SHR     R0.CC,R0,R6;     # set all flags
SHL.X   R8.CC,R1,R7;     # R8=R1<< (32-n); ZF acc'd; SF,CF,OF unch.
OR      R0,R0,R8;        # CC unch.
SHR.XHI R1.CC,R1,R6;     # ZF accumulated; OF,SF set; CF unch.
```

Extended Precision ISET.X and ISETP.X

An extended precision integer compare and set (predicate) operation can be performed on extended precision source operands via a sequence of IADD and IADD.X instructions that subtract the low-order words, followed by an ISET.X or ISETP.X instruction on the most significant word. An extended precision integer compare and set is performed by comparing the extended precision source operands with a specified comparison operation, and combining the result of the comparison operation with a predicate operand stored in the predicate register 402(0) using a Boolean operation. The final Boolean result of the extended precision integer compare and set (predicate) operation ISET.X or ISETP.X is stored in a destination register or destination predicate register based on the result of the Boolean operation. The Boolean operation may be and AND, OR or XOR operation.

The comparison operation is performed by subtracting the least-significant extended precision source operand words with a borrow from the condition code carry flag CC.CF, i.e. by computing Ra+~Sb+CC.CF, comparing that with zero, and considering the condition code zero flag CC.ZF set by a prior subtraction. ISETP.X may follow a sequence of IADD and IADD.X instructions that perform an extended-precision (multi-word) subtraction, thereby completing the most-significant word of an extended-precision comparison. ISETP.X determines whether the extended comparison test is zero by ANDing the extended compare difference zero-ness with the prior condition code zero flag CC.ZF.

The following comparison operations can be performed via extended precision integer compare and set predicate operation ISETP.X.

| SIGNED Integer Comparison (A .cmp B) | | |
|---|---|---|
| Name | Compare | Description |
| .F | 0 | False |
| .LT | A < B | Less Than |
| .EQ | A == B | Equal |
| .LE | A <= B | Less than or Equal |
| .GT | A > B | Greater Than |
| .NE | A != B | Not Equal |
| .GE | A >= B | Greater than or Equal |
| .T | 1 | True |

| UNSIGNED Integer Comparison (A .cmp B) | | |
|---|---|---|
| Name | Compare | Description |
| .F | 0 | False |
| .LO, .LT | A < B | Lower than |
| .EQ | A == B | Equal |
| .LS, .LE | A <= B | Lower or Same |
| .HI, .GT | A > B | Higher than |
| .NE | A != B | Not Equal |
| .HS, .GE | A >= B | Higher or Same |
| .T | 1 | True |

In one embodiment, via the ISETP instruction, the result of the extended precision integer compare and set operation is stored in two predicate registers in the predicate register 402(0) based on the Boolean comparison operation.

Below is a table that summarizes the operation of the different extended precision instructions discussed above. The term "L-to-M" means least-significant to most-significant processing order, and the term "M-to-L" means most-significant to least-significant processing order.

| Extended-Precision Instruction | Order; Instruction Sequence | CC.CF | CC.OF | CC.SF | CC.ZF |
|---|---|---|---|---|---|
| Integer Add | L-to-M IADD IADD.X IADD.X | Set by each instruction in sequence and indicates carry-out | Set by each instruction in sequence and indicates overflow | Set by each instruction in sequence and indicates sign | Accumulated |
| Integer Multiply-Add | L-to-M IMAD IMAD.X IMAD.X | Set by each instruction in sequence and indicates carry-out | Set by each instruction in sequence and indicates overflow | Set by each instruction in sequence and indicates sign | Accumulated |

-continued

| Extended-Precision Instruction | Order; Instruction Sequence | CC.CF | CC.OF | CC.SF | CC.ZF |
|---|---|---|---|---|---|
| Logical Operation | L-to-M LOP LOP.X LOP.X | Set by each instruction in sequence and indicates carry-out | Set by each instruction in sequence and indicates overflow | Set by each instruction in sequence and indicates sign | Accumulated |
| Integer Min/Max | M-to-L IMNMX.XHI IMNMX.XMED IMNMX.XLO | Indicates whether order has been determined; cleared by last instruction | Indicates the determined order; cleared by last instruction | Set by each instruction in sequence and indicates sign | Accumulated |
| Shift Left | M-to-L SHL SHR.X OR SHL.X | Set by initial instruction in sequence and indicates carry-out | Set by initial instruction in sequence and indicates overflow | Set by initial instruction in sequence and indicates sign | Accumulated |
| Shift Right | L-to-M SHR SHL.X OR SHR.X | Set by initial instruction in sequence and indicates carry-out | Set by last instruction in sequence and indicates overflow | Set by last instruction in sequence and indicates sign | Accumulated |
| Integer Compare and Set (Predicate) | L-to-M IADD IADD.X ISET.X | Set by each instruction in sequence and indicates carry-out | Set by each instruction in sequence and indicates overflow | Set by each instruction in sequence and indicates sign | Accumulated by IADDs; final set by ISET |

Figure 5A:
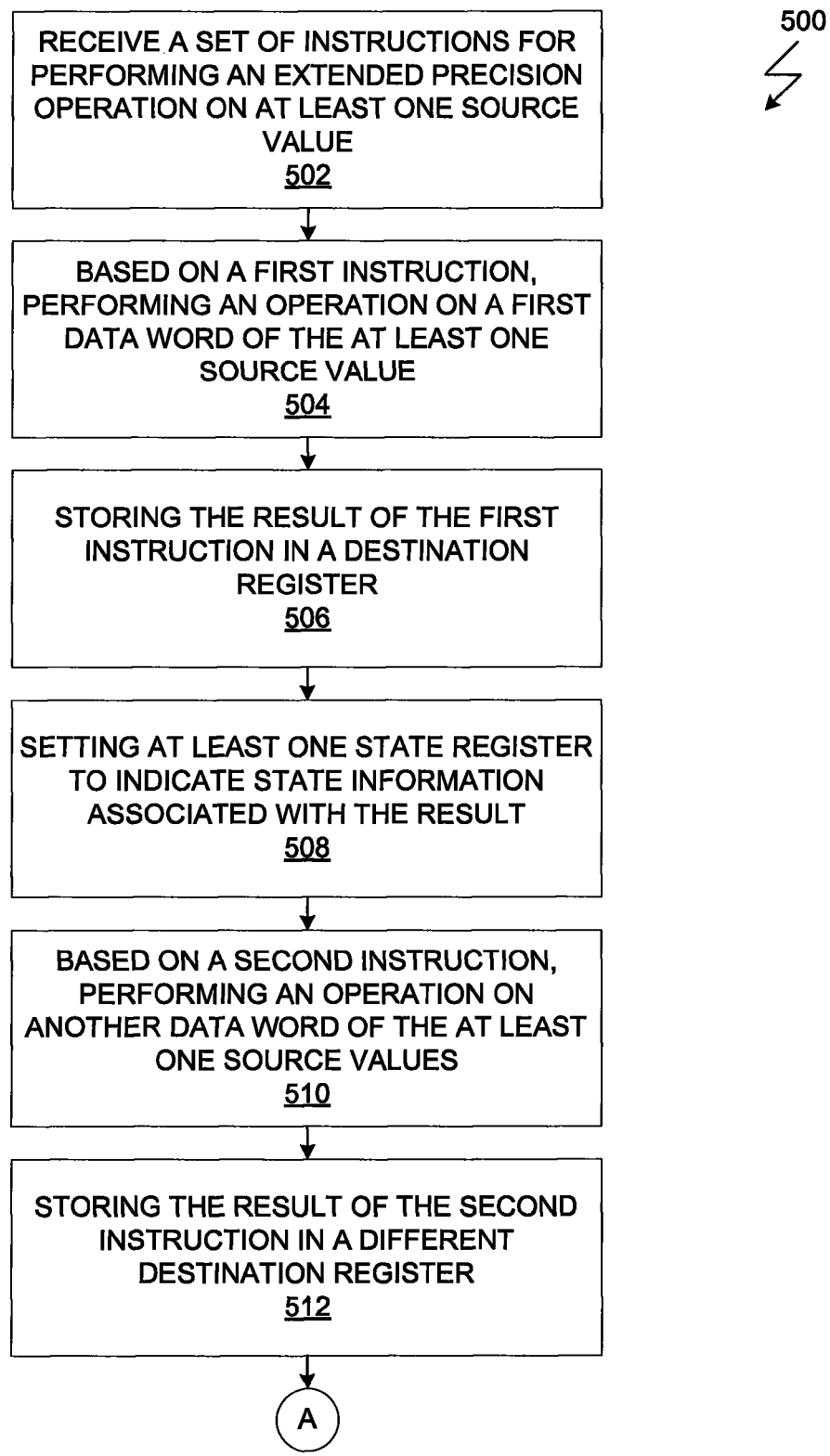
FIGS. 5A and 5B set forth a flow diagram of method steps for performing an extended precision operation on a plurality of source operands, according to one embodiment of the present invention.
Figure 5B:
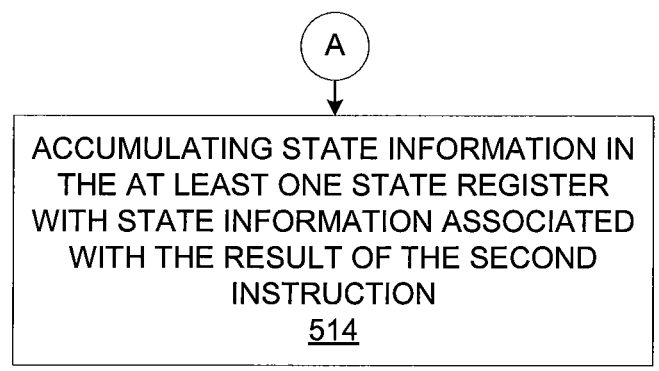

FIGS. 5A and 5B set forth a flow diagram of method steps for performing an extended precision operation on a plurality of source operands, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502, where the SPM 310 receives a set of instructions for performing an extended precision operation on at least one extended precision source values. The extended precision operation can be any one of the extended precision operations described above, such as an extended precision arithmetic operation, an extended precision integer minimum/maximum operation, or an extended precision shift operation. In the case of the extended precision shift operation, for example, there is only one extended precision source value that is shifted. In the case of the extended precision addition operation, for example, multiple extended source values are added together. The source values are multi-data word values, where each data word is stored in a different source register. As previously described herein, the set of instructions is executed by each thread executing in the SPM 310, where the source registers for each thread may be different. The following steps are described in conjunction with operations performed in one thread executing the set of instructions.

At step 504, based on a first instruction of the set of instructions, an operation is performed on a data word of the at least one source values. The order of processing the data words is dependent on the type of extended precision operation being performed. For example, in the case of an extended precision arithmetic operation, the first instruction processes the lower-order data words, whereas, in the case of the extended precision integer minimum/maximum operation, the first instruction processes the highest-order data words.

At step 506, the result of the operation performed by the first instruction is stored in a destination register. Importantly, the result of the operation is a portion of the result of the extended precision operation. At step 508, state information, such as sign, carry, zero and overflow, associated with the result of the operation is set in the condition code. In some cases, the state information indicates to subsequent instructions how to process corresponding data words.

At step 510, based on a second instruction of the set of instructions, an operation is performed on another data word of the at least one source value. In some cases, the second operation also incorporates some of the state information stored in the condition code. For example, in the case of the extended precision integer arithmetic operation, the carry-in value set by a previous IADD or IADD.X instruction is incorporated by subsequent instructions.

At step 512, the result of the operation performed by the second instruction is stored in another destination register. Importantly, the result of the operation performed by the second instruction is another portion of the result of the extended precision operation. At step 514, state information, such as sign, carry, zero and overflow, associated with the result of the operation performed by the second instruction is stored is set in the condition code. The CC.ZF of the condition code is accumulated with a portion of the state information associated with the result.

Advantageously, the technique described herein allows for the efficient calculation of extended precision integer arithmetic, logical, and comparison operations with reduced instruction count compared to prior architectures. In addition, state information is propagated using condition code flags to indicate the status of the entire result rather than the last word-length partial result at no cost above computing the multi-word result. Further, the technique described herein does not add any new machine state per thread, which is crucial for cost-efficient implementation in highly parallel SIMT and SIMD architectures.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for performing an extended precision operation, the method comprising:
receiving a set of instructions for performing an extended precision operation on at least one extended precision source value, wherein an extended precision source value includes at least two fixed-size data words;
based on a first instruction included in the set of instructions, performing a first operation on a first data word of a first extended precision source value included in the at least one extended precision source value to generate a first portion of a result for the extended precision operation;
storing state information associated with the first portion of the result in one or more state registers;
based on a second instruction included in the set of instructions, performing a second operation on a second data word of the first extended precision source value to generate a second portion of the result for the extended precision operation; and
accumulating state information stored in at least one of the one or more state registers with state information associated with the second portion of the result, wherein the accumulated state information indicates overall state associated with the result for the extended precision operation.

2. The method of claim 1, wherein the step of storing state information comprises setting a first register to indicate whether the first portion of the result is zero, and the step of accumulating state information comprises combining the value stored in the first register with state information associated with the second portion of the result that indicates whether the second portion of the result is zero.

3. The method of claim 2, wherein the at least one extended precision source value comprises a second extended precision source value, the step of performing the first operation comprises performing the first operation on both the first data word of the first extended precision source value and a first data word of a second extended precision source value, and the step of performing the second operation comprises performing the second operation on both the second data word of the first extended precision source value and a second data word of the second extended precision source value.

4. The method of claim 3, wherein the two first data words are least-significant data words included in the first extended precision source value and the second extended precision source value, respectively, and the two second data words are most-significant data words included in the first extended precision source value and the second extended precision value, respectively.

5. The method of claim 4, further comprising setting a sign register, an overflow register and a carry register to reflect state information associated with the second portion of the result.

6. The method of claim 4, wherein the extended precision operation comprises an integer arithmetic operation, and the step of storing state information comprises setting a first register to indicate a carry-in value associated with the first portion of the result, wherein the second operation incorporates the carry-in value indicated by the first register.

7. The method of claim 4, wherein the extended precision operation comprises an integer compare and set operation, the first operation performed on the two first data words comprises a subtraction operation, the step of storing state information comprises setting a first register to indicate a carry-in value associated with the first portion of the result, and the second operations performed on the two second data words comprises a subtraction operation based on the carry-in value and a comparison operation.

8. The method of claim 7, wherein the result is stored in at least one predicate register.

9. The method of claim 3, wherein the extended precision operation comprises an integer minimum/maximum operation, the step of storing state information comprises clearing a first register to indicate that the two first data words are not equal and a second register to indicate which of the two first data words is selected as the first portion of the result.

10. The method of claim 9, wherein the step of performing the second operation comprises selecting, based on the value stored in the second register, which of two second data words as the second portion of the result.

11. The method of claim 1, wherein the first data word is the most-significant data words included in the first extended precision source value and the second data word is the least-significant data words included in the first extended precision source value.

12. The method of claim 1, wherein the step of storing state information comprises setting a sign register, an overflow register, a zero register, a carry register to reflect state information associated with the first portion of the result.

13. A computer system, comprising:
a memory; and
a parallel processing unit configured to:
receive a set of instructions for performing an extended precision operation on at least one extended precision source value, wherein an extended precision source value includes at least two fixed-size data words;
based on a first instruction included in the set of instructions, perform a first operation on a first data word of a first extended precision source value included in the at least one extended precision source value to generate a first portion of a result for the extended precision operation;
store state information associated with the first portion of the result in one or more state registers;
based on a second instruction included in the set of instructions, perform a second operation on a second data word of the first extended precision source value to generate a second portion of the result for the extended precision operation; and
accumulating state information stored in at least one of the one or more state registers with state information associated with the second portion of the result, wherein the accumulated state information indicates overall state associated with the result for the extended precision operation.

14. The computer system of claim 13, wherein the step of storing state information comprises setting a first register to indicate whether the first portion of the result is zero, and the step of accumulating state information comprises combining the value stored in the first register with state information associated with the second portion of the result that indicates whether the second portion of the result is zero.

15. The computer system of claim 14, wherein the at least one extended precision source value comprises a second extended precision source value, the step of performing the first operation comprises performing the first operation on both the first data word of the first extended precision source value and a first data word of a second extended precision source value, and the step of performing the second operation comprises performing the second operation on both the second data word of the first extended precision source value and a second data word of the second extended precision source value.

16. The computer system of claim 15, wherein the two first data words are least-significant data words included in the first extended precision source value and the second extended precision source value, respectively, and the two second data words are most-significant data words included in the first extended precision source value and the second extended precision value, respectively.

17. The computer system of claim 16, further comprising setting a sign register, an overflow register and a carry register to reflect state information associated with the second portion of the result.

18. The computer system of claim 16, wherein the extended precision operation comprises an integer arithmetic operation, and the step of storing state information comprises setting a first register to indicate a carry-in value associated with the first portion of the result, wherein the second operation incorporates the carry-in value indicated by the first register.

19. The computer system of claim 16, wherein the extended precision operation comprises an integer compare and set operation, the first operation performed on the two first data words comprises a subtraction operation, the step of storing state information comprises setting a first register to indicate a carry-in value associated with the first portion of the result, and the second operations performed on the two second data words comprises a subtraction operation based on the carry-in value and a comparison operation.

20. The computer system of claim 19, wherein the result is stored in at least one predicate register.

21. The computer system of claim 13, wherein the first data word is the most-significant data words included in the first extended precision source value and the second data word is the least-significant data words included in the first extended precision source value.

* * * * *